(12) United States Patent
Smirnov et al.

(10) Patent No.: US 11,761,485 B2
(45) Date of Patent: Sep. 19, 2023

(54) CONTROLLING MAGNETIC LEVITATION EQUIPMENT

(71) Applicant: SPINDRIVE OY, Lappeenranta (FI)

(72) Inventors: Alexander Smirnov, Lappeenranta (FI); Nikita Uzhegov, Lappeenranta (FI)

(73) Assignee: SPINDRIVE OY, Lappeenranta (FI)

( * ) Notice: Subject to any disclaimer, the term of this patent is extended or adjusted under 35 U.S.C. 154(b) by 0 days.

(21) Appl. No.: 18/020,973

(22) PCT Filed: Aug. 18, 2021

(86) PCT No.: PCT/FI2021/050555
§ 371 (c)(1),
(2) Date: Feb. 13, 2023

(87) PCT Pub. No.: WO2022/038312
PCT Pub. Date: Feb. 24, 2022

(65) Prior Publication Data
US 2023/0213061 A1 Jul. 6, 2023

(30) Foreign Application Priority Data
Aug. 21, 2020 (EP) ..................................... 20192136

(51) Int. Cl.
*F16C 32/04* (2006.01)

(52) U.S. Cl.
CPC ...... *F16C 32/0451* (2013.01); *F16C 32/0457* (2013.01); *F16C 32/0474* (2013.01)

(58) Field of Classification Search
CPC .............. F16C 32/0451; F16C 32/0457; F16C 32/0474; H02K 7/09

(Continued)

(56) References Cited

U.S. PATENT DOCUMENTS 6,278,251 B1 * 8/2001 Schob ................. A61M 60/824
  318/434
9,624,974 B2 * 4/2017 Kozaki ................... H02P 21/36
(Continued)

FOREIGN PATENT DOCUMENTS

GB        2294559 A        5/1996

OTHER PUBLICATIONS

International Search Report and Written Opinion in Application No. PCT/FI2021/050555, dated Dec. 9, 2021, 10 pages.

*Primary Examiner* — Ahmed Elnakib
(74) *Attorney, Agent, or Firm* — Meunier Carlin & Curfman LLC

(57) ABSTRACT

There is provided a controller for magnetic levitation equipment comprising a plurality of current source modules for connecting to at least one power supply for direct current, DC, and said current source modules comprising current channels for actuating coils of the magnetic levitation equipment, and a controller device connected to the current source modules by a control connection for controlling switching of electric current by the current source modules to the current channels. The current source modules combine discrete components for amplifying and switching electric current to the current channels into a single package. In this way, manufacturing and maintenance of the controller is facilitated, since manufacturing and maintenance may be based on the current source modules instead of discrete components, e.g. gate drivers, IGBTs, power mosfets and diodes.

18 Claims, 5 Drawing Sheets

(58) Field of Classification Search
USPC .......................................................... 310/90.5
See application file for complete search history.

(56) References Cited

U.S. PATENT DOCUMENTS

| | | | |
|---|---|---|---|
| 2009/0265038 A1* | 10/2009 | Ramsey | F16C 37/005 |
| | | | 384/590 |
| 2017/0108038 A1* | 4/2017 | Jastrzebski | F16C 32/0453 |
| 2017/0334294 A1* | 11/2017 | Chen | H02P 27/08 |

* cited by examiner

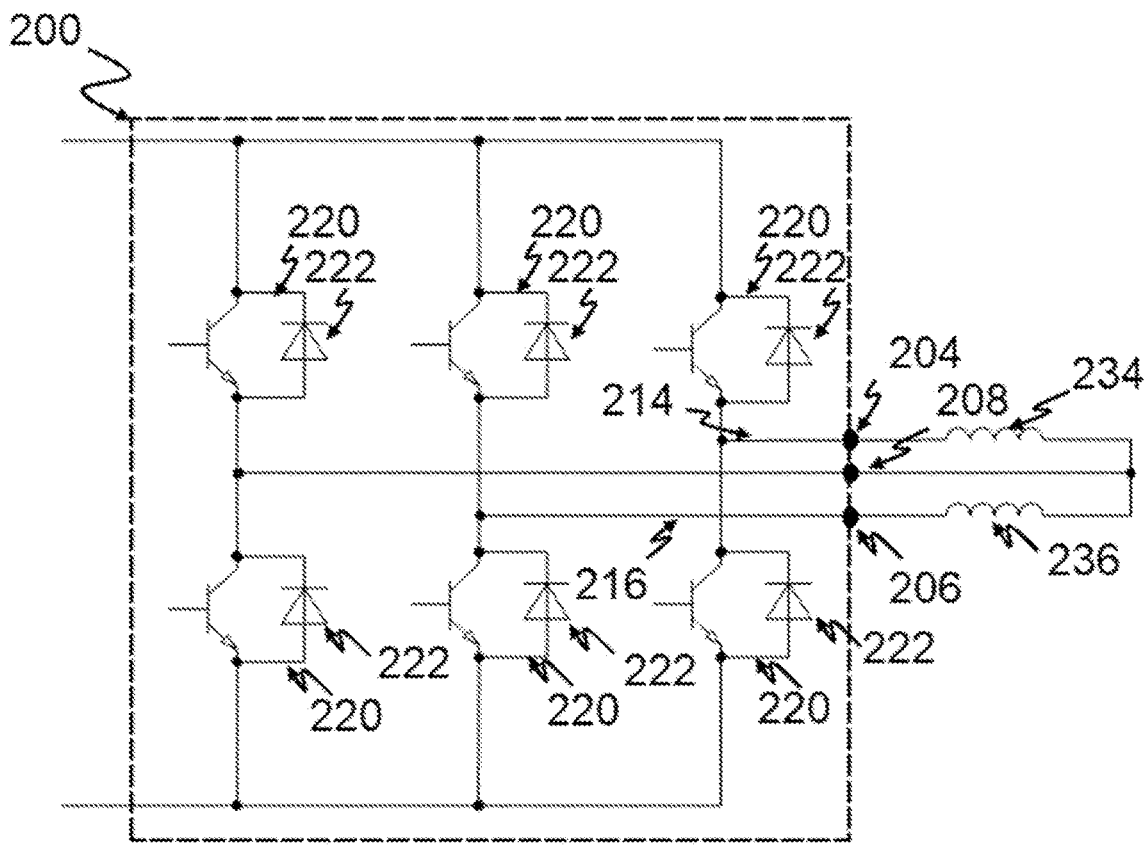

Fig. 2

302 connecting, by the plurality of current source modules comprising current channels for actuating coils of the magnetic levitation equipment, to at least one power supply for direct current, DC 304 controlling, by a controller device connected to the current source modules by a control connection, switching of electric current by the current source modules to the current channels

Fig. 3

CONTROLLING MAGNETIC LEVITATION EQUIPMENT

CROSS REFERENCES

This application is a U.S. national stage application of international patent application number PCT/FI2021/050555, filed on Aug. 18, 2021, claiming priority to European national application number 201921368 filed on Aug. 21, 2020.

TECHNICAL FIELD

The examples and non-limiting embodiments relate to controlling magnetic levitation equipment.

BACKGROUND

In magnetic levitation, forces exerted by magnetic; fields are used to counteract other forces e.g. the gravity, whereby levitation of objects is achieved. Positions of levitated objects can be controlled by electric; currents that are fed to coils that generate the magnetic fields. An example application of magnetic levitation is in magnetic bearings that are used to levitate rotating shafts.

Switching amplifiers can be used to provide controlled current sources for magnetic levitation. The switching amplifiers can be built from discrete components such as diodes and power switches like Integrated Bipolar Transistors (IGBTs) according to a H-bridge topology or a 3-phase bridge topology. A switching amplifier for a magnetic bearing controller can have ten controlled current channels, which means a relatively high number of discrete components and a complex structure of the switching amplifier. A separate gate driver is also needed for controlling power switches, which leads to a complicated structure of the magnetic bearing controller. Manufacturing and maintenance of such magnetic bearing controllers can therefore be complex and time consuming.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

FIG. 2 illustrates an example of a current source module in accordance with at least some embodiments.

FIG. 3 illustrates an example of a method for a controller for magnetic levitation equipment in accordance with at least some embodiments.

DETAILED DESCRIPTION OF EXAMPLE EMBODIMENTS

As used within this description and drawings, "I" may be interpreted as a recitation of "or", "and", or "both".

There is provided a controller for magnetic levitation equipment comprising a plurality of current source modules for connecting to at least one power supply for direct current, DC, and said current source modules comprising current channels for actuating coils of the magnetic levitation equipment, and a controller device connected to the current source modules by a control connection for controlling switching of electric current by the current source modules to the current channels. The current source modules combine discrete components for amplifying and switching electric current to the current channels into a single package. In this way, manufacturing and maintenance of the controller is facilitated, since manufacturing and maintenance may be based on the current source modules instead of discrete components, e.g. gate drivers, IGBTs, power mosfets and diodes.

Figure 1:
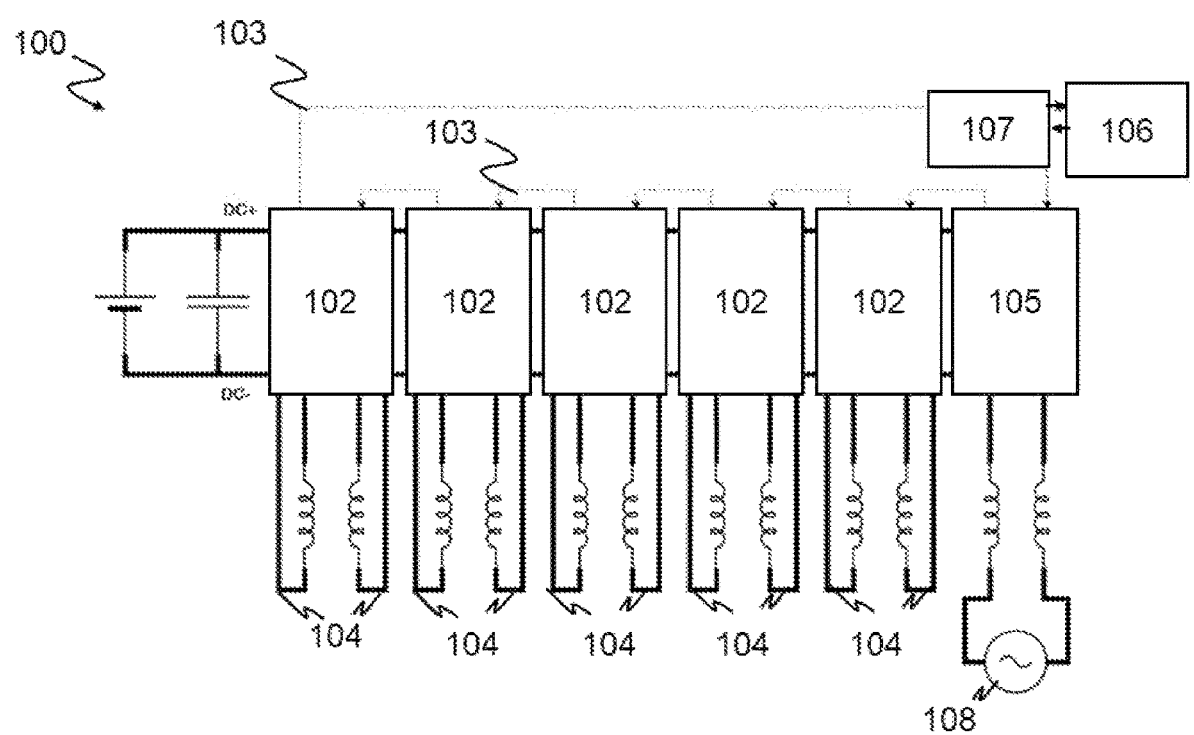
FIG. 1 illustrates a controller for magnetic levitation equipment in accordance with at least some embodiments.

FIG. 1 illustrates a controller 100 for magnetic levitation equipment in accordance with at least some embodiments. A plurality of current source modules 102, 105 are connected by a control connection 103 to a controller device 106. A current source module 102, 105 combines discrete components, e.g. gate drivers, IGBTs, power mosfets and diodes, for amplifying and switching electric current into a single package of electronic components. The package comprises connectors for interfacing with other devices. The package may be e.g. mounted on a Printed Circuit Board (PCB). At least part of the current source modules 102 may comprise two current channels for supplying electric current to coils of the magnetic levitation equipment. In FIG. 1, the current source modules 102 are illustrated connected to the coils. The controller device may control the current source modules 102 to switch electric current to the current channels 104 for actuating the coils connected to the current channels. The current source modules 102 may be configured to connect to a power supply 108 for receiving an electric current for powering the current channels 104. At least part of the current source modules 105 may serve for connecting to an Alternating Current (AC) power supply 108. AC received from the AC power supply may be rectified by the at least part of the current source modules 105 and fed to the current source modules 102 connected to the coils. Accordingly, the at least part of the current source modules 102 that are used for supplying electric current to the coils may be connected via the at least part of the current source modules 105 to the AC power supply. In accordance with at least some embodiments, the current source modules 102, 105 comprise Direct Current (DC) connectors for removably connecting to a DC bus and control connectors for removably connecting to the controller device by the control connection 103. In this way the controller is modular and the controller 100 may be manufactured to include current source modules as needed for providing a number of current channels needed for various applications of magnetic levitation. Also maintenance of the controller 100 is facilitated since current source modules may be replaced as needed which is faster than troubleshooting and maintenance of discrete components. Examples of the connectors comprise at least pin connectors. The connectors may be directly between a current source module and the DC bus and/or between the current source module and the controller device. On the other hand the connectors may be between PCBs, where the current source module is soldered to one PCB and the PCB comprising the current source module is connected by the connectors to one or more other PCBs that comprise the controller device and the DC bus.

In an example, the current source modules 102, 105 may be power modules for powering semiconductor devices. In the industry, the power modules may be referred to integrated power modules (IPMs), Smart Power Modules or Intelligent power Modules. In the following the power modules may be referred to as IPMs. At least part of the IPMs of the controller 100 may comprise two current channels for supplying electric current to coils of the magnetic levitation equipment, and at least part of the IPMs may serve for rectifying Alternating Current (AC) from an AC power supply into DC for the IPMs supplying electric current to the coils. The IPMs combine discrete components for amplifying and switching electric current to the current channels into a single package. The IPMs provide that instead of discrete components, e.g. gate drivers, IGBTs, power mosfets and diodes, manufacturing and maintenance of the controller may be performed using the IPMs. An IPM may comprise one or more connectors for electric current and a control connection. It should be noted that a current source module 102 or IPM may comprise an on-board controller device, e.g. a microcontroller, whereby the control connection 103 may be between the controller device 106 and the on-board controller device of the current source module. On the other hand, when a current source module or IPM does not have an on-board controller device, e.g. a microcontroller, the control connection 103 may be between the controller device 106 and components, e.g. gate drivers of IGBTs and/or power mosfets of the current source module 102 for amplifying and switching electric current to the current channels 104.

Examples of the control connection 103 comprise control buses for communications of data such as digital serial buses in accordance with a Serial Peripheral Interface (SPI), I²C and RS-232.

In an example, the control connection 103 provides communications of control signals and/or data between the controller device 106 and the plurality of current source modules. The data may comprise measurements of electric current of the current channels from sensors connected to the current channels. The control signals may comprise pulse width modulated signals for controlling switching of electric current fed to current channels that actuate coils for magnetic levitation.

An IPM may comprise one or more DC connectors for DC input/output, a control connector for control signals from the controller device 106 and one or more AC connectors for AC input/output. An IPM for supplying electric current to coils of a magnetic levitation equipment may be connected at one or more DC connectors to a source of DC current, at the control connector to the controller device 106 and at one or more AC connectors to coils of a magnetic levitation equipment. The source of DC current may be a DC power bus, a DC power supply or a rectifier for supplying DC rectified from AC received from an AC power supply 108. In an example, the rectifier may be an IPM serving for rectifying AC from an AC power supply into DC. DC from the rectifier may be supplied to the IPMs supplying electric current to coils of a magnetic levitation equipment. The IPM serving for rectifying AC from an AC power supply into DC may be connected at one or more DC connectors to one or more IPMs and/or a power bus for supplying electric current to coils of a magnetic levitation equipment. Furthermore, the IPM serving for rectifying AC from an AC power supply into DC may be connected at a control connector to the controller device 106 and at one or more AC connectors to the AC power supply 108. The controller device may be connected by the IPMs over a control connection 103, e.g. a control bus.

The IPMs are commercially available at least from On Semiconductor (https://www.onsemi.com/products/power-modules/intelligent-power-modules-ipms), Infineon (https://www.infineon.com/cms/en/product/power/intelligent-power-modules-ipm/) and Fuji Electric Corp. of America (https://americas.fujielectric.com/products/semiconductors/igbt/igbt-modules-ipm/). One example of IPM is described in 600 V SPM 3 Ver6, Series IPMs, described in Application Note at https://www.onsemi.com/pub/Collateral/AN-9088.PDF, by On Semiconductor. FIG. 37 of the Application Note shows a general application circuitry of interface schematic of the IPM with control signals connected directly to a Micro Controller Unit (MCU).

Examples of the controller device 106 comprise at least a processor, Field Programmable Gate Array (FPGA), an Application specific Integrated Circuit (ASIC), MCU and/or a Digital Signal Processor (DSP).

Examples of the magnetic levitation equipment comprise at least magnetic bearings for industrial machines such as compressors, turbines, pumps, motors and generators, where the magnetic bearing may be used for levitating a rotating shaft.

In accordance with at least some embodiments, the control connection comprises one or more digital isolators 107 for communications of control signals and/or data between the controller device 106 and the plurality of current source modules 102, 105. The data may be e.g. measurements of electric current of current channels received at the controller device from sensors connected to the current channels. Accordingly, the digital isolator may be a communications device configured to electrically isolate the controller device 106 from the current source modules. Advantageously, a single digital isolator 107 may be used for the communications between the controller device 106 and the plurality of current source modules 102, 105, whereby a simple structure of the controller may be supported. Examples of the digital isolators comprise optical isolators such as optical diodes, magnetic isolators such as transformers and capacitive isolators such as capacitors. Transformers and capacitors serving for digital isolators may be manufactured by a semiconductor manufacturing process and may be based on Complementary Metal-Oxide-Semiconductor (CMOS) technology. Digital isolators are commercially available for example from Analog Devices (https://www.analog.com/en/products/landing-pages/001/icoupler-technology-alternative-to-optocouplers.html).

FIG. 2 illustrates an example of a current source module in accordance with at least some embodiments. The current source module may be an IPM. The current source module 200 may be a current source module 102 for supplying electric current to coils of the magnetic levitation equipment described with FIG. 1. The current source module 200 may comprise switching equipment, e.g. gate drivers, IGBTs 220 and diodes 222, for a 3-phase electric current and the switching equipment is connected to two current channels 214, 216 by three ports 204, 206, 208, and one of the ports 208 is configured to connect to both of the current channels 214, 216, when the current channels 214, 216 are connected to the coils 234, 236. In this way, each of the current channels 214, 216 become a part of a circuit that includes the coil 234, 236 and two of the three ports of the current source module, when the current channel 214, 216 is connected to the coil 234, 236.

FIG. 3 illustrates a method for a controller for magnetic levitation equipment in accordance with at least some embodiments. The method may be performed by the controller described with FIG. 1. The method provides controlling switching of electric current fed to current channels that actuate coils for magnetic levitation.

Phase 302 comprises connecting, by the plurality of current source modules comprising current channels for actuating coils of the magnetic levitation equipment, to at least one power supply for direct current, DC.

Phase 304 comprises controlling, by a controller device connected to the current source modules by a control connection, switching of electric current by the current source modules to the current channels.

In an example, phase 302 comprises connecting to a DC power bus or a rectifier.

In an example, phase 304 comprises the controller device determining switching times for the switching of electric current by the current source modules to the current channels. In an example, the controller device may control the switching by control signals to the current source modules over the control connection. The control signals may comprise pulse width modulated signals, where a width of a pulse may determine a time during which an electric current is switched to a current channel. A switching time may be determined on the basis of a timing, e.g. a rising edge of a pulse, of the pulse width modulated signal. The switching times may be determined for positioning an object at a desired position by magnetic levitation. The switching times may be determined specific to an application of the magnetic levitation. Examples of the applications of the magnetic levitation comprise magnetic bearings for industrial machines such as compressors, turbines, pumps, motors and generators, where the magnetic bearing may be used for levitating a rotating shaft.

Figure 4:
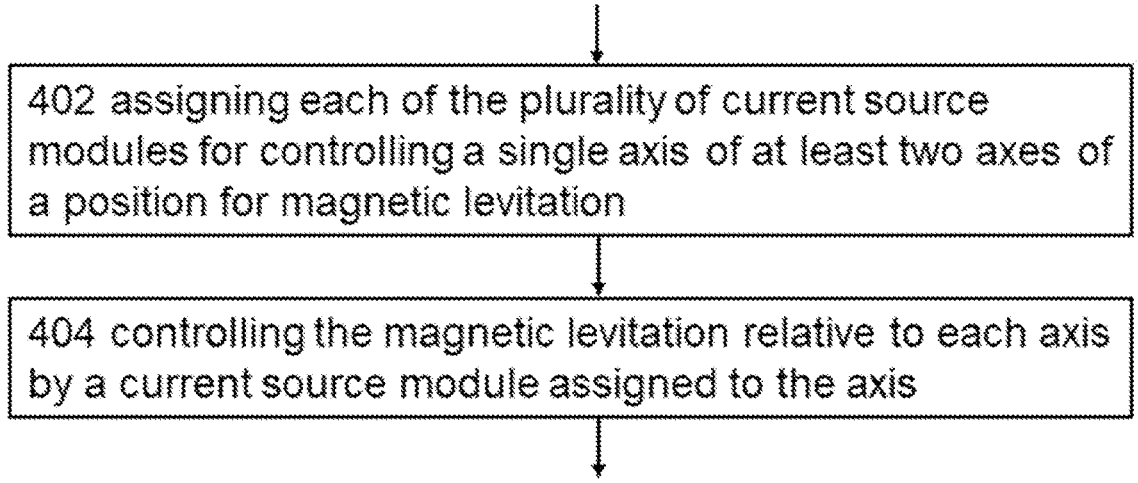
FIG. 4 illustrates an example of a method for a controller for magnetic levitation equipment in accordance with at least some embodiments.

FIG. 4 illustrates an example of a method for a controller for magnetic levitation equipment in accordance with at least some embodiments. The method may be performed by the controller, e.g. by the controller device, described with FIG. 1, for example at phase 304 of FIG. 3. The method provides distribution of current through current source modules.

Phase 402 comprises assigning each of the plurality of current source modules for controlling a single axis of at least two axes of a position for magnetic levitation.

Phase 404 comprises controlling the position for magnetic levitation relative to each axis by a current source module assigned to the axis. Since each current source module has two current channels that are connected to coils of the magnetic levitation equipment, the current channels may be used for controlling position for magnetic levitation in opposite directions along a given axis, e.g. a positive direction and a negative direction, controlled by each current source module. In this way uneven temperature distribution across the current source modules may be at least partially eliminated in the controller.

In an example, phase 402 comprises that the position is determined using a cartesian coordinate system. The position may be e.g. a position of a rotating shaft. Accordingly, the axes may comprise X-, Y- and Z-axis. Then, each current source module may be used for controlling one of the X-, Y- and Z-axis. Therefore, current channels of a current source module may be used for controlling a position for magnetic levitation along one of the X-, Y- and Z-axis. The directions may be e.g. a positive direction and a negative direction. Accordingly, controlling switching of electric current to a current channel of a current source module may control a position for magnetic levitation in one direction of one of the X-, Y- or Z-axis, and controlling switching of electric current to another current channel of the same current source module may control a position for magnetic levitation in another direction of the same axis.

Figure 5:
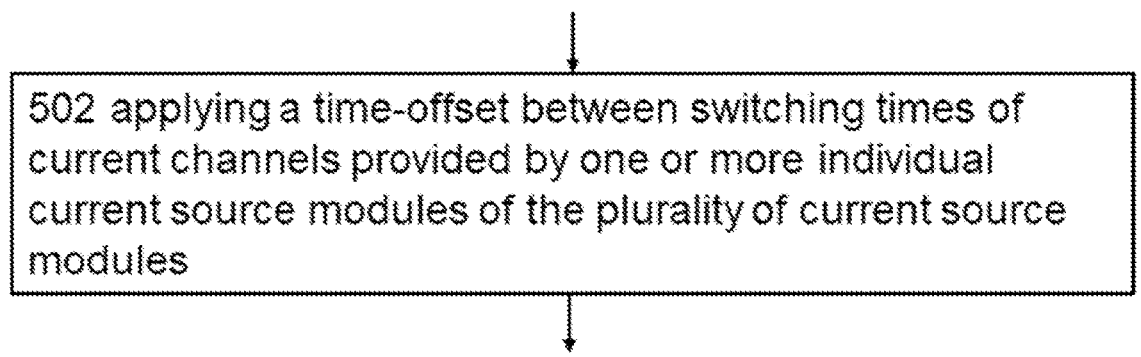
FIG. 5 illustrates an example of a method for a controller for magnetic levitation equipment in accordance with at least some embodiments.

FIG. 5 illustrates an example of a method for a controller for magnetic levitation equipment in accordance with at least some embodiments. The method may be performed by the controller, e.g. by the controller device, described with FIG. 1, for example at phase 304 of FIG. 3.

Phase 502 comprises applying a time-offset between switching times of current channels provided by one or more individual current source modules of the plurality of current source modules. The time-offset provides that a switching time between one current channel provided by an individual current source module is offset in time with respect to a switching time of another current channel provided by the same current source module. In this way the switching times of the current channels of the same current source module do not take place simultaneously and measurement noise in measurements of a current value of a current channel may be decreased and even minimized. Accordingly, the time-offset in phase 502 may be a delay between switching times defined by pulse width modulated signals that control switching times of respective current channels of the same current source module.

Figure 6:
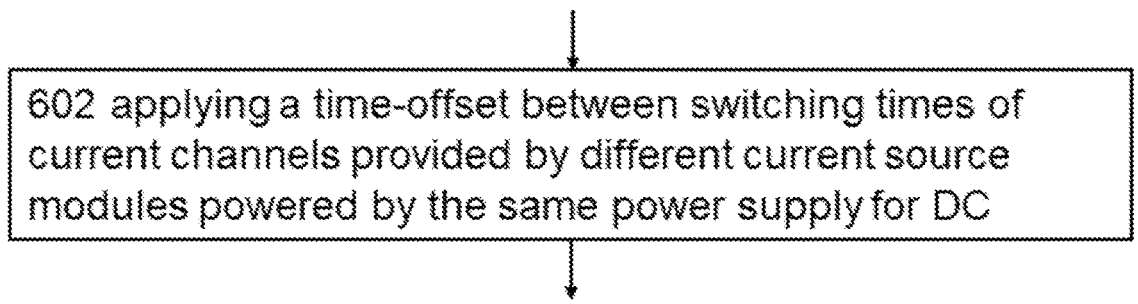
FIG. 6 illustrates an example of a method for a controller for magnetic levitation equipment in accordance with at least some embodiments.

FIG. 6 illustrates an example of a method for a controller for magnetic levitation equipment in accordance with at least some embodiments. The method may be performed by the controller, e.g. by the controller device, described with FIG. 1, for example at phase 304 of FIG. 3.

Phase 602 comprises applying a time-offset between switching times of current channels provided by different current source modules powered by the same power supply for DC. In this way measurement noise from neighboring current source modules to measurements of a current value of a current channel of a current source module may be decreased and even minimized. Accordingly, the time-offset in phase 602 may be a delay between switching times defined by pulse width modulated signals that control switching times of respective current channels of different current source modules, i.e. neighboring current channels, of the controller.

Figure 7:
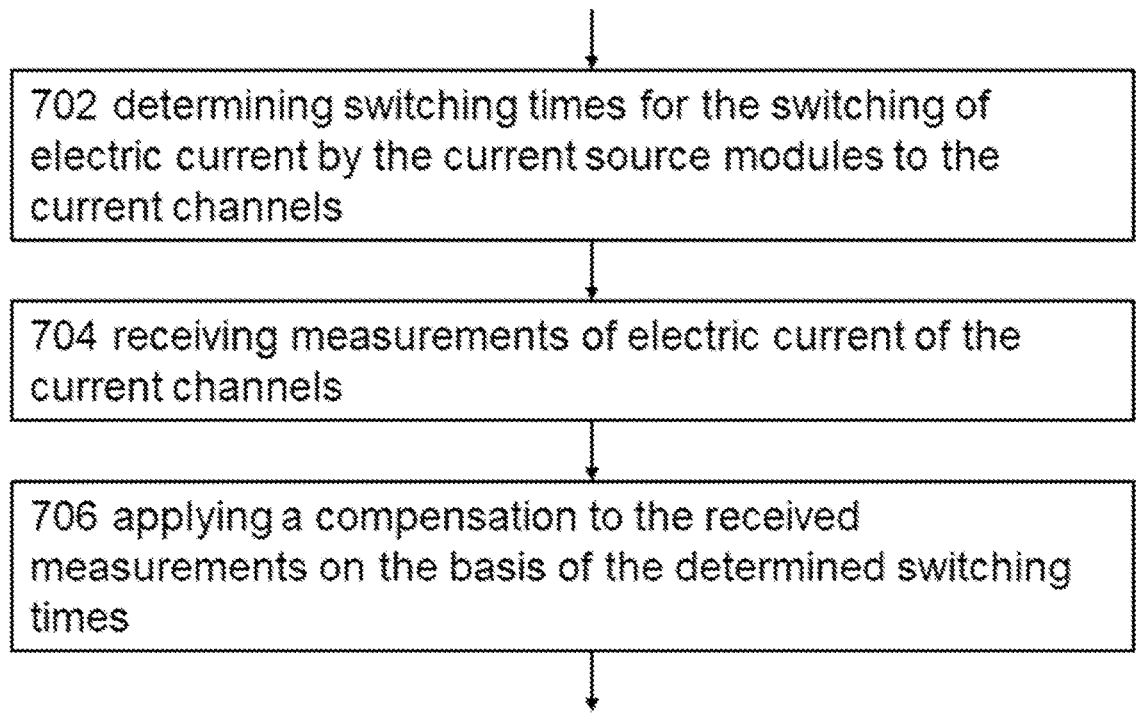
FIG. 7 illustrates an example of a method for a controller for magnetic levitation equipment in accordance with at least some embodiments.

FIG. 7 illustrates an example of a method for a controller for magnetic levitation equipment in accordance with at least some embodiments. The method may be performed by the controller, e.g. by the controller device, described with FIG. 1, for example at phase 304 of FIG. 3.

Phase 702 comprises determining switching times for the switching of electric current by the current source modules to the current channels.

Phase 704 comprises receiving measurements of electric current of the current channels.

Phase 706 comprises applying a compensation to the received measurements on the basis of the determined switching times.

In an example, referring to FIG. 7, phase 706 comprises eliminating the received measurements on the basis of the received measurements coinciding with switching times of one or more current channels. The eliminating of the received measurements may be carried by signal processing of received measurement samples. The signal processing may comprise filtering and/or windowing of the received measurements for example. This allows reducing unreliable measurements polluted with noise.

Figure 8:
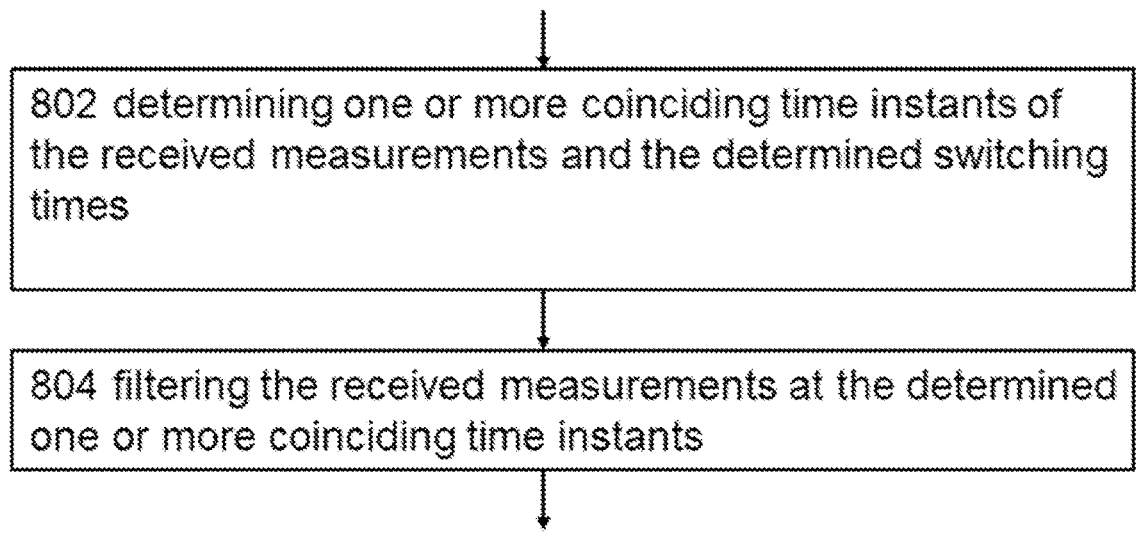
FIG. 8 illustrates an example of a method for a controller for magnetic levitation equipment in accordance with at least some embodiments.

FIG. 8 illustrates an example of a method for a controller for magnetic levitation equipment in accordance with at least some embodiments. The method may be performed by the controller, e.g. by the controller device, described with FIG. 1, for example at phase 706 of FIG. 7, for applying a compensation to the received measurements.

Phase 802 comprises determining one or more coinciding time instants of the received measurements and the determined switching times.

Phase 804 comprises filtering the received measurements at the determined one or more coinciding time instants.

In an example, referring to FIG. 8, phase 804, may comprise that the received measurements comprise samples and the filtering comprises that averaging gains are assigned to the samples of the received measurements. Reduced averaging gains may be assigned to samples that coincide with the switching times.

In an example, referring to FIGS. 5, 6, 7 and 8, phases 502, 602, 702, 802, may comprise the controller device determining switching times of current channels of one or more current source modules. The switching times may be determined for positioning an object at a desired position by magnetic levitation. The switching times may be determined specific to an application of the magnetic levitation. Examples of the applications of the magnetic levitation comprise magnetic bearings for industrial machines such as compressors, turbines, pumps, motors and generators, where the magnetic bearing may be used for levitating a rotating shaft.

Figure 9:
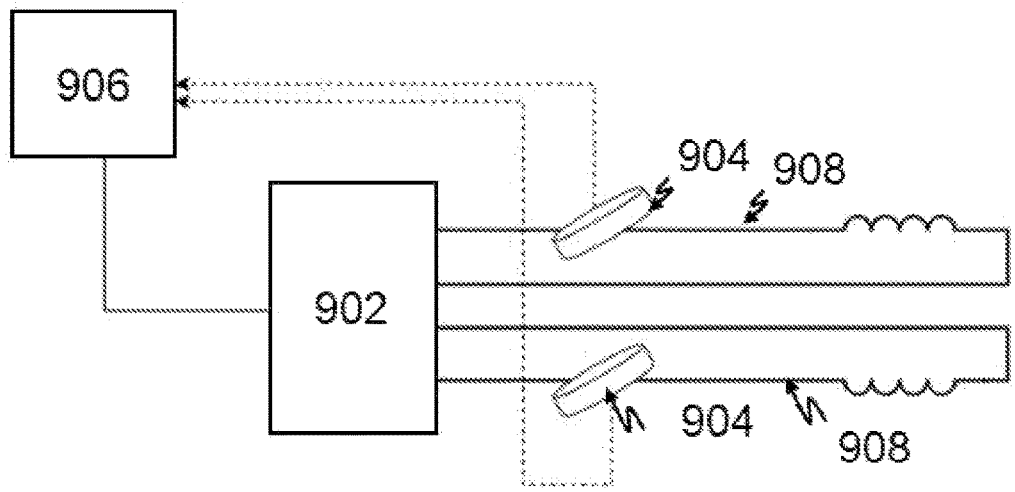
FIG. 9 illustrates an example of an arrangement for receiving measurements of electric current of current channels in a controller for magnetic levitation equipment in accordance with at least some examples.

FIG. 9 illustrates an example of an arrangement for receiving measurements of electric current of current channels in a controller for magnetic levitation equipment in accordance with at least some examples.

The controller for magnetic levitation equipment may comprise a controller device 906 connected to one or more current source modules 902. The current source modules comprise current channels comprising current channels 908 for actuating coils of the magnetic levitation equipment. Sensors 904 may be connected to the current channels for receiving measurements of electric current of the current channels 908. In an example, the measurements comprise digital samples indicating electric current. The sensors may be connected to the controller device by a control connection, e.g. a control bus. The controller, controller device and current channels may be in accordance with the description of the controller, controller device, control connection and current channels given with FIG. 1. The arrangement may be used for performing one or more functionalities of a method described herein.

It should be noted that, although various examples and embodiments are described herein with reference to current source modules such as power modules and IPMs, the examples and embodiments are applicable to current source modules, power modules, IPMs or any device that may provide current channels for actuating coils of a magnetic levitation equipment and combine discrete components for amplifying and switching electric current to the current channels into a single package.

In accordance with at least some embodiments, there is provided a computer program comprising instructions to cause a controller for magnetic levitation equipment comprising a plurality of current source modules and a controller device connected to the current source modules, to execute a method and/or one or more functionalities according to a method described herein.

A memory may be a computer readable medium that may be non-transitory. The memory may be of any type suitable to the local technical environment and may be implemented using any suitable data storage technology, such as semiconductor based memory devices, magnetic memory devices and systems, optical memory devices and systems, fixed memory and removable memory. The controller may be of any type suitable to the local technical environment, and may include one or more of general purpose computers, special purpose computers, processors, microprocessors, Field Programmable Gate Arrays (FPGAs), Application specific Integrated Circuits (ASICs), MCUs, Digital Signal Processors (DSPs).and processors based on multi core processor architecture, as non-limiting examples.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A controller for magnetic levitation equipment comprising:
  a plurality of current source modules for connecting to at least one power supply for direct current, DC, and said current source modules comprising current channels for actuating coils of the magnetic levitation equipment;
  a controller device connected to the current source modules by a control connection for controlling switching of electric current by the current source modules to the current channels; wherein each of the current source modules comprises switching equipment for a 3-phase electric current and the switching equipment is connected to two current channels by three ports, and one of the ports is configured to connect to both of the current channels, when the current channels are connected to the coils.

2. The controller according to claim 1, wherein the current source modules comprise DC connectors for removably connecting to a direct current, DC, bus and control connectors for removably connecting to the controller device by the control connection.

3. The controller according to claim 1, wherein the control connection comprises a digital isolator for communications of control signals and/or data between the controller device and the plurality of current source modules.

4. The controller according to claim 1, wherein the controller device is caused to:
 assign each of the plurality of current source modules for controlling a single axis of at least two axes of a position for magnetic levitation; and
 control the position for magnetic levitation relative to each axis by a current source module assigned to the axis.

5. The controller according to claim 1, wherein the controller device is caused:
 apply a time-offset between switching times of current channels provided by one or more individual current source modules of the plurality of current source modules.

6. The controller according to claim 1, wherein the controller device is caused:
 apply a time-offset between switching times of current channels provided by different current source modules powered by the same power supply for DC.

7. The controller according to claim 1, wherein the controller device is caused:
 determine switching times for the switching of electric current by the current source modules to the current channels;
 receive measurements of electric current of the current channels; and
 apply a compensation to the received measurements on the basis of the determined switching times.

8. The controller according to claim 7, wherein the controller device is caused to:
 determine one or more coinciding time instants of the received measurements and the determined switching times; and
 filter the received measurements at the determined one or more coinciding time instants.

9. A method for a controller for magnetic levitation equipment comprising:
 a plurality of current source modules for connecting to at least one power supply for direct current, DC, and said current source modules comprising current channels for actuating coils of the magnetic levitation equipment;
 a controller device connected to the current source modules by a control connection for controlling switching of electric current by the current source modules to the current channels; wherein each of the current source modules comprises switching equipment for a 3-phase electric current and the switching equipment is connected to two current channels by three ports, and one of the ports is configured to connect to both of the current channels, when the current channels are connected to the coils, wherein the method comprises:
 connecting, by the plurality of current source modules comprising current channels for actuating coils of the magnetic levitation equipment, to at least one power supply for direct current, DC; and
 controlling, by the controller device connected to the current source modules by a control connection, switching of electric current by the current source modules to the current channels.

10. The method according to claim 9, comprising:
 applying, by the controller device, a time-offset between switching times of current channels provided by one or more individual current source modules of the plurality of current source modules.

11. The method according to claim 9, comprising:
 applying, by the controller device, a time-offset between switching times of current channels provided by different current source modules powered by the same power supply for DC.

12. The method according to claim 9, comprising:
 determining, by the controller device, switching times for the switching of electric current by the current source modules to the current channels;
 receiving, by the controller device, measurements of electric current of the current channels; and
 applying, by the controller device, a compensation to the received measurements on the basis of the determined switching times.

13. The method according to claim 12, comprising:
 determining, by the controller device, one or more coinciding time instants of the received measurements and the determined switching times; and
 filtering, by the controller device, the received measurements at the determined one or more coinciding time instants.

14. A non-transitory computer readable medium comprising program instructions stored thereon for performing by a controller comprising:
 a plurality of current source modules for connecting to at least one power supply for direct current, DC, and said current source modules comprising current channels for actuating coils of the magnetic levitation equipment;
 a controller device connected to the current source modules by a control connection for controlling switching of electric current by the current source modules to the current channels; wherein each of the current source modules comprises switching equipment for a 3-phase electric current and the switching equipment is connected to two current channels by three ports, and one of the ports is configured to connect to both of the current channels, when the current channels are connected to the coils; at least:
 connecting, by the plurality of current source modules comprising current channels for actuating coils of the magnetic levitation equipment, to at least one power supply for direct current, DC;
 controlling, by the controller device connected to the current source modules by a control connection, switching of electric current by the current source modules to the current channels.

15. The non-transitory computer readable medium according to claim 14 for performing by the controller at least:
 applying, by the controller device, a time-offset between switching times of current channels provided by one or more individual current source modules of the plurality of current source modules.

16. The non-transitory computer readable medium according to claim 14 for performing by the controller at least:
  applying, by the controller device, a time-offset between switching times of current channels provided by different current source modules powered by the same power supply for DC.

17. The non-transitory computer readable medium according to claim 14 for performing by the controller at least:
  determining, by the controller device, switching times for the switching of electric current by the current source modules to the current channels;
  receiving, by the controller device, measurements of electric current of the current channels; and
  applying, by the controller device, a compensation to the received measurements on the basis of the determined switching times.

18. The non-transitory computer readable medium according to claim 17 for performing by the controller at least:
  determining, by the controller device, one or more coinciding time instants of the received measurements and the determined switching times; and
  filtering, by the controller device, the received measurements at the determined one or more coinciding time instants.

* * * * *